United States Patent
Natarajan et al.

(10) Patent No.: US 6,993,335 B2
(45) Date of Patent: Jan. 31, 2006

(54) APPARATUS AND METHOD FOR MOBILE/IP HANDOFF BETWEEN A PLURALITY OF ACCESS TECHNOLOGIES

(75) Inventors: Kadathur S. Natarajan, Wilmette, IL (US); Karthikeyan Arumugam, Wauconda, IL (US); Muddasani S. Reddy, Lake Bluff, IL (US); Mary M. Valdivia, Lake Zurich, IL (US); Ajoy K. Singh, Round Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/295,187

(22) Filed: Nov. 15, 2002

(65) Prior Publication Data
US 2004/0097230 A1 May 20, 2004

(51) Int. Cl.
*H04Q 7/20* (2006.01)

(52) U.S. Cl. ............... 455/437; 455/414.2; 455/67.13; 455/561

(58) Field of Classification Search ... 453/414.1–414.3, 453/436–441, 445, 67.11–67.13, 561; 379/114.05, 379/114.1, 114.3; 455/436–444
See application file for complete search history.

(56) References Cited

U.S. PATENT DOCUMENTS

| | | | | |
|---|---|---|---|---|
| 5,276,906 A | * | 1/1994 | Felix | 455/438 |
| 5,448,569 A | * | 9/1995 | Huang et al. | 370/332 |
| 5,483,669 A | * | 1/1996 | Barnett et al. | 455/437 |
| 5,542,097 A | * | 7/1996 | Ward et al. | 455/437 |
| 5,678,185 A | | 10/1997 | Chia | |
| 5,732,352 A | * | 3/1998 | Gutowski et al. | 455/437 |
| 5,884,176 A | * | 3/1999 | Vaara | 455/438 |
| 6,049,715 A | * | 4/2000 | Willhoff et al. | 445/436 |
| 6,055,428 A | * | 4/2000 | Soliman | 455/437 |
| 6,363,252 B1 | | 3/2002 | Hämäläinen et al. | |
| 6,438,377 B1 | * | 8/2002 | Savolainen | 455/439 |

\* cited by examiner

*Primary Examiner*—Charles Craver
(74) *Attorney, Agent, or Firm*—Lalita W. Pace

(57) ABSTRACT

An apparatus and method for performing Mobile/IP handoff between different access technologies. Associated with each access technology are two thresholds, a Low Water Mark and a High Water Mark. The method uses these water marks to its access technology selection in a particular environment. Using the method, a mobile node 102 remains on its preferred network when the signal strength on the preferred network (interface) is above the low water mark. When the signal strength on the preferred network drops below the high water mark, the method calculates the low water mark for the network. When the signal strength on the preferred network drops below the low water mark (LWM), the method initiates handoff to the next available network that meets certain conditions. The method initiates handoff back to the preferred network when the signal strength measurement on the preferred network is again above the high water mark.

9 Claims, 6 Drawing Sheets

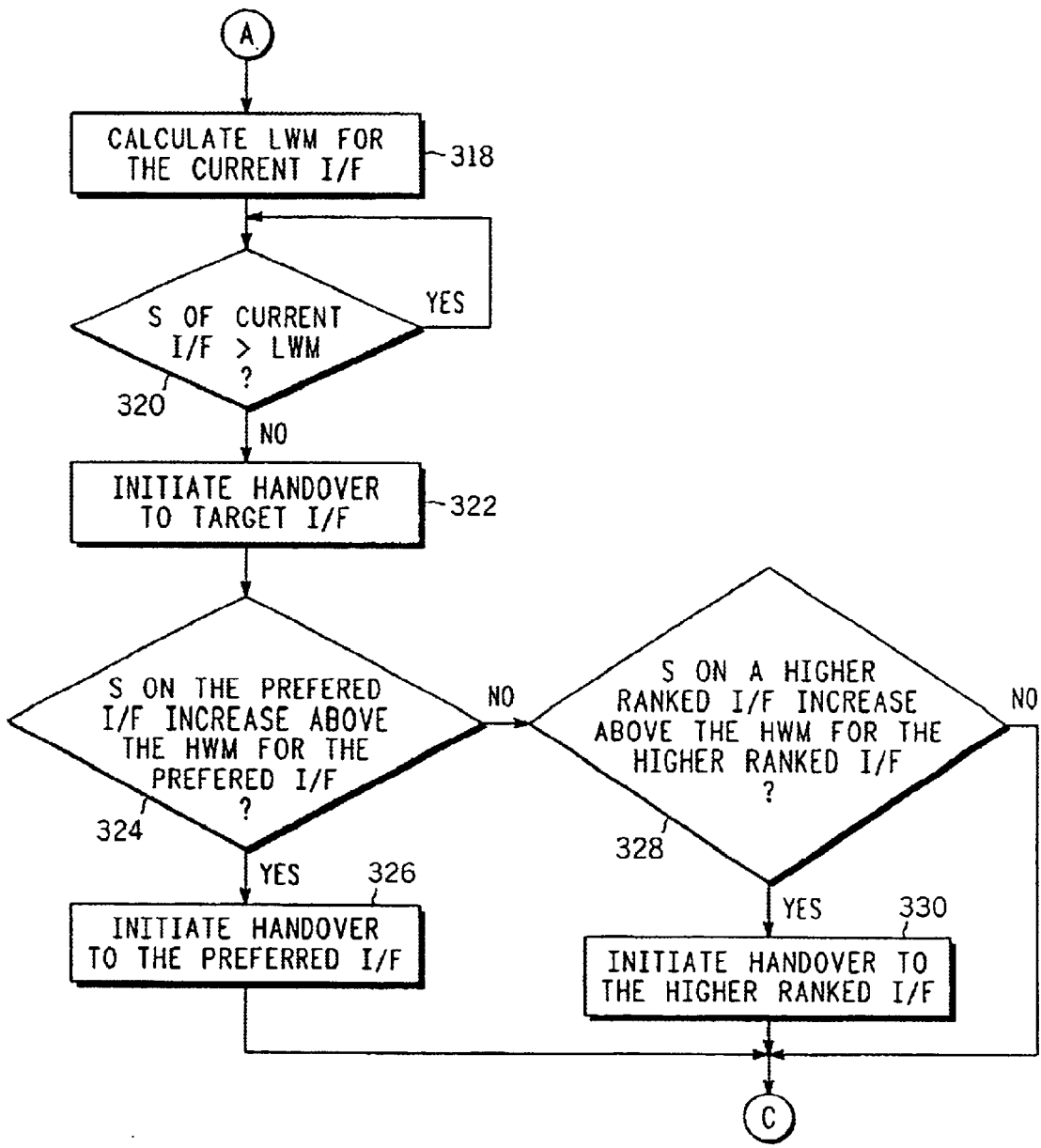
FIG. 3 (Continuation)

APPARATUS AND METHOD FOR MOBILE/IP HANDOFF BETWEEN A PLURALITY OF ACCESS TECHNOLOGIES

FIELD OF THE INVENTION

The invention relates generally to the field of communications, and more particularly to an apparatus and method for handoff between different access technologies.

BACKGROUND OF THE INVENTION

Multiple competing technologies are being pursued as potential candidates for future wireless networks. General Packet Radio Service (GPRS), Wideband Code Division Multiple Access (WCDMA), CDMA 2000, Wireless Local Areas Network (WLAN), HiperLAN and Bluetooth are some of the potential access technologies that are expected to provide potential 2.5G/3G/4G services. The emergence of various access technologies for 2.5G/3G/4G services necessitates the need for some inter-technology handoff method, which can be deployed across heterogeneous networks to support seamless handoff. Mobile/Internet Protocol (IP) is being proposed as "the" technology to enable seamless handoff across different technologies. As a network layer protocol, Mobile/IP is well positioned to solve the inter-working function for heterogeneous wireless networks. However, due to inherent limitations of basic Mobile/IP, it is not considered optimal for real time services.

Thus, there is a need for a method of improved Mobile/IP handoff from one technology to another.

DETAILED DESCRIPTION OF THE PREFERRED EMBODIMENT

The present invention enhances the performance of Mobile/IP handoff to support seamless inter-technology handoff. Devices that support multiple interfaces can, by using the preferred embodiment of the method of the present invention, switch from one Layer 2 (L2) interface to another without disrupting application sessions that are currently active. The invention is described using WLAN and CDMA technologies. However, it will be understood by one of ordinary skill in the art, that the invention is applicable to handoff across a variety of access technologies.

A first aspect of the invention provides, in a mobile communication device configured to support a plurality of interfaces, a method of handoff comprising sensing that a signal strength on a current interface of the plurality of interfaces is at or below a first threshold for the current interface; determining a target interface of the plurality of interfaces to handoff to; calculating a second threshold; and initiating a first handoff to the target interface when the signal strength on the current interface reaches the second threshold. A second aspect of the invention provides a mobile communication device configured to support a plurality of interfaces wherein each interface is associated with an access network. The device comprises a receiver for receiving signals from an access network; a processor coupled to the receiver, the processor sensing that a signal strength on the current interface is at or below a first threshold for the current interface, determining a target interface of the plurality of interfaces to handoff to, calculating a second threshold, and determining that the device should initiate handoff to the target interface when the signal strength on the current interface reaches the second threshold; and a transmitter coupled to the processor for transmitting signals to an access network.

Figure 1:
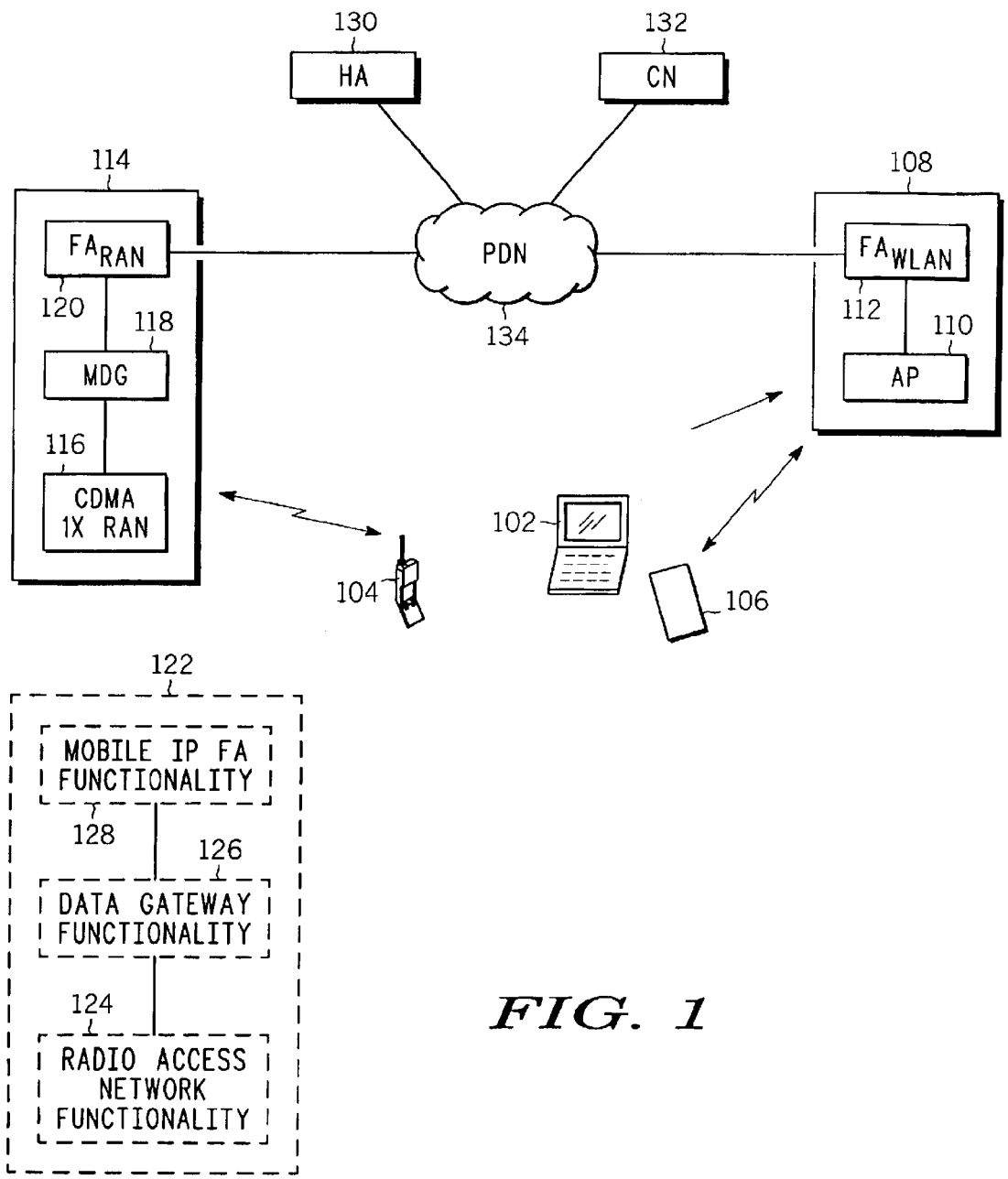
FIG. 1 is a block diagram of the functional architecture of an Inter-Technology System that can be used with the current invention.

FIG. 1 is an example of a multiple access technology (inter-technology) system that can be used with the present invention. The system depicts the functional architecture of a system with a CDMA 1X Foreign Network 114 and a WLAN Foreign Network 108. As shown in dotted lines, other foreign networks 122 such as Bluetooth, 3.5 G and 4G, for example, may also be included in the inter-technology system. In the preferred embodiment, the mobile node (MN) 102 is a laptop that has two interfaces. In alternate embodiments, the MN 102 may be any mobile communication device such as a Personal Digital Assistant (PDA) or cellular telephone. The MN 102 accesses the WLAN Foreign Network 108 via a WLAN PC card 106. The WLAN Foreign Network 108 includes an Access Point (AP) 110 and a Foreign Agent for the WLAN ($FA_{WLAN}$) 112. The AP 110 is the transceiver that communicates with the WLAN PC card 110 over the air using the 802.11b protocol. The AP 110 is connected to the wired network using standard Ethernet cable. It acts as a bridge between wireless users and the wired LAN. The $FA_{WLAN}$ 112 is a mobility agent on the WLAN network 108. When the MN 102 is visiting the WLAN Foreign Network 108, the WLAN foreign agent 112 detunnels the datagrams received from the Home Agent (HA) 130 and forwards the datagrams to the MN 102.

The MN 102 accesses the CDMA 1X network 114 via a CDMA 1X mobile station (MS) 104. The CDMA 1X network 114 includes a CDMA 1X Radio Access Network (RAN) 116, a Motorola Data Gateway (MDG) 118 and a Foreign Agent for the RAN ($FA_{RAN}$) 120. The CDMA 1X RAN 116 provides the RF functionality for the network and serves as a link between the MS 104 and the MDG 118. The CDMA 1X RAN 116 supports the IS-2000 air interface protocol. The MDG 118 provides the interworking between the CDMA 1X RAN 116 and the mobility enabled IPv4 core network. The MDG 118 relays bearer and control traffic between the $FA_{RAN}$ 120 and the CDMA 1X RAN 116 and is the end point for Point-to-Point Protocol (PPP) termination with the MN 102. The $FA_{RAN}$ 120 performs the function for the CDMA 1X RAN 116 as previously described with respect to the WLAN network 108.

The HA 130 resides on the MN's home network that is part of the core network. (In FIG. 1, the MDG 118, $FA_{RAN}$ 120, HA 130, CN 132, PDN 134, $FA_{WLAN}$ 112, Mobile IP FA functionality 128 and Data Gateway functionality 126 are considered part of the core network.) The HA 130 tunnels datagrams to the appropriate foreign agent when the MN 102 is away from home and maintains the current location information for the MN 102. The correspondent node (CN) 132 is a peer that communicates with the MN 102. It may be anywhere on the Packet Data Network (PDN) 134. The MN 102 may communicate with the CN 132 for File Transfer Protocol, web browsing, streaming video, etc. A CDMA 1X RAN 116, MDG 118 and mobile station 104 that can be used with the present invention is are commercially available from Motorola, Inc., Schaumburg, Ill. An FA 112, 120; HA 130; MN 102; WLAN PC Card 106 and AP 110 that can be used with the present invention are commercially available from Cisco Systems, Inc., San Jose, Calif. The CN 132 can be implemented using any general purpose computer running Mobile/IP software commercially available from Cisco. The PDN consists of a network of IP routers. Such routers are commercially available from many vendors such as Cisco Systems Inc., Nortel Networks, Ontario, Canada and others.

There are two serial connections between the MN 102 and the MS 104. One connection is for the PPP connection that is used for the packet data call. The other serial connection is used to obtain the pilot (signal) strength from the MS 104.

Currently, with basic Mobile/IP, the MN 102 does not change its FA (i.e., access technology) unless it stops receiving agent advertisement messages from the current FA. For example, if a MN 102 is attached to a first FA, via an L2 interface, it continues to renew its registration through the first FA until it stops receiving agent advertisement messages. The MN 102 registers through a different FA only when it is unable to receive agent advertisements from the current FA. This property of the MN 102 prohibits it from switching FAs unless it loses L2 connectivity with the current FA. In the process, service is disrupted at the application layer. When the MN 102 stops receiving advertisements from the first FA and starts receiving agent advertisements from a second FA, it initiates the registration process through the new FA (second FA). Thus, it is apparent that traditional use of Mobile/IP for inter-technology handoff cannot be used to provide seamless inter-technology handoff. Under traditional methods, the MN 102 experiences service disruption at the network layer because it cannot initiate Mobile/IP registration with a new (FA) until communication with the old FA is lost.

The present invention provides an automatic monitoring and triggering approach to initiate seamless inter-technology handoffs which can be used at the MN 102 that overcomes the limitations of basic Mobile/IP. More particularly, the invention provides an improved MN 102 that utilizes movement detection based upon signal strength measurement when there is more than one interface available. The approach imparts a seamless nature to the handoff scheme by taking advantage of its ability to negotiate Mobile IP registration on a target interface while still maintaining L2 connectivity on the current interface. The adaptive algorithm determines the timing for the triggering of this negotiation process so that the MN 102 can maximize its presence on the most preferred network.

Figure 2:
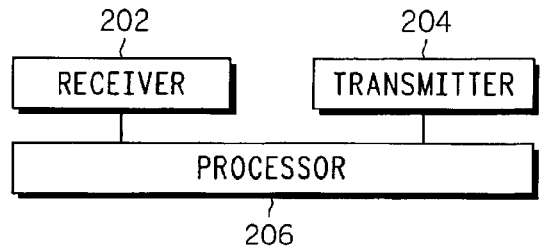
FIG. 2 is a simplified block diagram of a mobile communication device in accordance with the present invention

FIG. 2 is a simplified block diagram of the MN 102 in accordance with the present invention. The MN 102 includes a receiver 202 for receiving signals transmitted from the CDMA 1X Foreign Network 114 (via the MS 104), the WLAN Foreign Network 108 (via the WLAN PC Card 106) and other foreign networks 122. The MN 102 also includes a transmitter 204 for transmitting signals to networks 114, 108,122. The receiver 202 and transmitter 204 are coupled to a processor 206, which contains logic to implement the method of the present invention. Any standard signal processor can be used to implement the invention.

Figure 3:
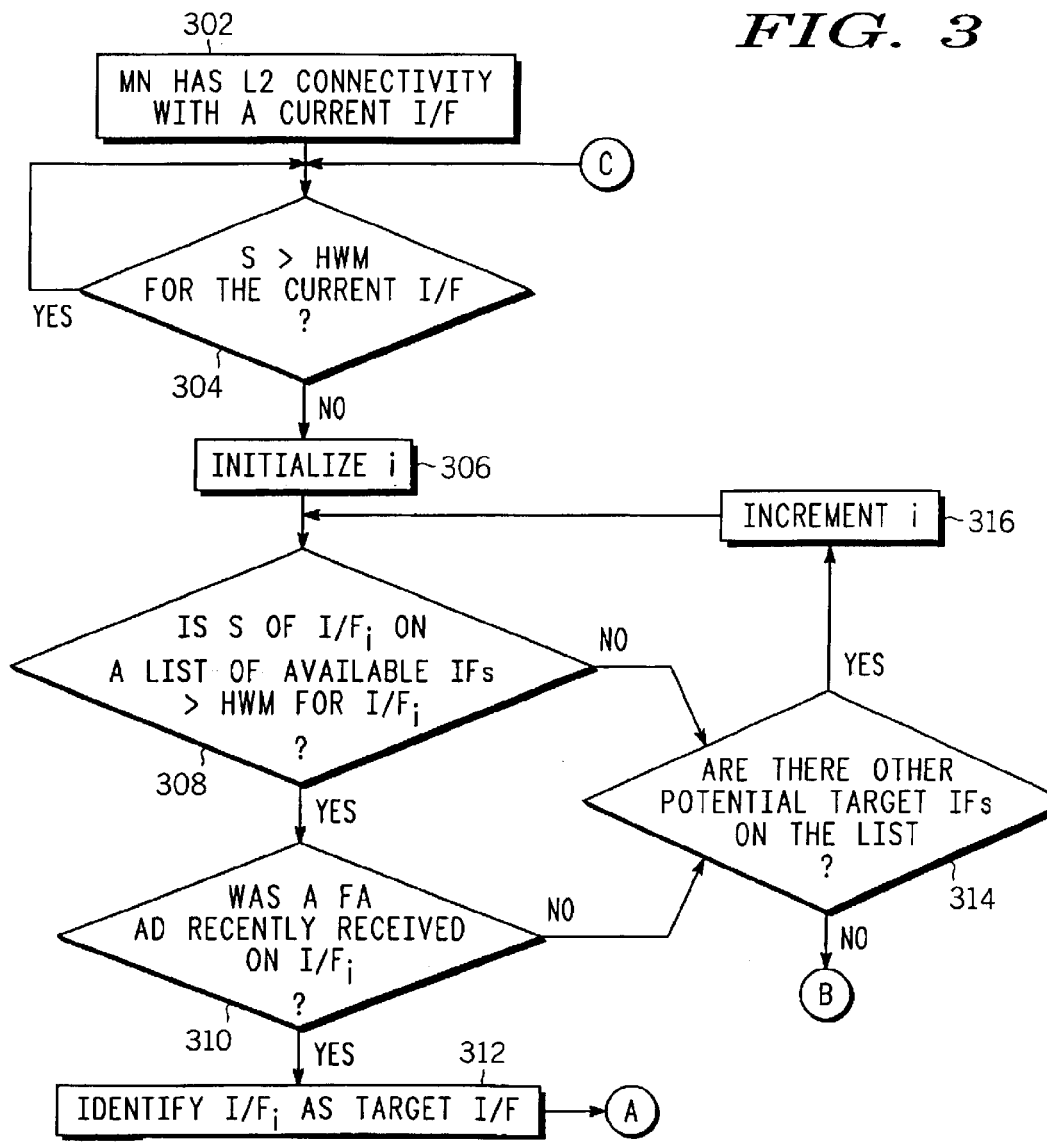
FIG. 3 is a flow diagram of a method of Mobile/IP handoff in accordance with the preferred embodiment of the present invention.

Turning now to FIG. 3, a method of handoff in accordance with the preferred embodiment of the present invention is shown. At step 302, the MN 102 has L2 connectivity with a current interface. In the preferred embodiment, the current interface is the interface that has been ranked the most preferred by the user. For example, using the system shown in FIG. 1, the user may rank the WLAN interface the most preferred, the CDMA interface the next most preferred, and so on.

At step 304, the method determines whether the signal strength on the current interface (WLAN interface in the current example) is greater than a first threshold, called a high water mark (HWM), for the current interface. The HWM is the signal strength at which L2 connectivity on the given interface is stable. The HWM is preferably set for each interface based on past history or using experimental data. At step 304, when the signal strength on the current interface is greater than the HWM for the current interface, there is no need for handoff and the method continues to monitor the signal strength. When the signal strength drops to or below the HWM for the current interface, the method looks for another interface to handoff to. In the preferred embodiment, the MN 102 maintains a list of available interfaces, each associated with a different access technology. At step 306, the method initializes a variable "i" to point to a potential target interface in the list. Preferably, the potential target interface is the interface ranked as the next most preferred (CDMA interface in the current example) by the user.

At steps 308 and 310, the method determines whether two conditions are met for the potential target interface. In particular, at step 308, the method determines whether the signal strength of the potential target interface is greater than the HWM for the potential target interface. When this condition is met, the method determines whether a FA advertisement was recently received on the potential target interface (step 310). In the preferred embodiment, if an FA advertisement has not been recently received, the method sends out a solicitation on that interface to receive one. When the condition at step 310 is met (FA advertisement recently received or FA received in response to solicitation), the method identifies the potential target interface as the target interface to handoff to (step 312). When either of the conditions at step 308 or step 310 is not met, the method determines whether there are other potential target interfaces to handoff to (step 314). When there are other potential target interfaces, the method increments the pointer to point to the next potential target interface (step 316) and proceeds back to step 308 to continue the process for identifying the target interface.

Continuing at step 318, once the target interface is identified, the method calculates the low water mark (LWM) for the current interface. The LWM is the signal strength on the current interface at which the MN 102 triggers a handoff to a different interface. The adaptive nature of the method lies in the calculation of the LWM. Two parameters used in calculating the LWM are Registration Time (RT) and Rate of Change of Signal Strength ($RCSS_i$). These parameters will now be described.

The RT is the time interval between the MN 102 sending out a Mobile IP Registration Request to the HA and receiving the corresponding Registration Reply from the HA. In the preferred embodiment, the MN 102 maintains a table of RTs for each available interface. In the current example, some sample RTs for a MN 102 with WLAN and CDMA available interfaces, are set forth in the table below:

| Interface | Registration Time |
|---|---|
| WLAN | 150 ms |
| CDMA | 320 ms |

The MN 102 may keep the RT values current in several ways (i.e., account for current traffic conditions on the given network). For example, the MN 102 may perform a "ping" toward the HA 130 and add that round trip time to a fixed time duration for performing a typical registration update at the HA 130. Alternatively, the MN 102 may periodically send out a dummy registration request, measure the time it takes to receive a reply, and update the Registration table. Another alternative is for the FA on a given network to maintain a historical registration time and provide it to the MN 102. For illustration of the preferred embodiment of the present invention, it is assumed that the Registration Time values in the table above reflect recent network conditions.

The MN 102 continuously measures the signal strength on each interface it has access to, and hence can keep track of the rate of signal strength variation at any given instant. For example, an AP in a WLAN environment periodically transmits beacon signals that can be sampled by an associated MN 102. If we assume that the signal strength of sample "i" is called $S_i$, the signal strength of the sequence of samples i+1, i+2, up to i+n will be $S_{i+1}$, $S_{i+2}$, up to $S_{i+n}$. Let the time difference between two successive samples be $\Delta$ seconds (e.g., in a WLAN environment, $\Delta$ is typically 0.1 seconds). The RCSS at the time of sample i+n is based on n consecutive samples, and can be calculated as:

$$RCSS_{i+n} = (S_i - S_{i+n})/(n^*\Delta) \quad (1)$$

When the next sample (i+n+1) is measured, the value of $RCSS_{i+n+1}$ will be calculated based on the most recent n samples only:

$$RCSS_{i+n+1} = (S_{i+1} - S_{i+n+1})/(n^*\Delta) \quad (2)$$

In the preferred embodiment of the present invention, the value of n is configurable, and is set according to user preference.

Referring back to the LWM calculation of step 318 in FIG. 3, to calculate the LWM, the MN 102 first calculates the length of time ($T_{LD}$) until the signal strength on the current interface hits the Link-Down Signal ($S_{LD}$). The $S_{LD}$ is the signal strength at which L2 connectivity on the interface is completely lost. Because handing off to another interface effectively means completing Mobile IP registration on the new interface, the MN 102 has to allow itself enough time to complete registration on the new interface before the link on the current interface is lost. Thus, to arrive at the time it would take the signal strength on the current interface to reach the LWM ($T_{LWM}$), the method deducts the Registration Time (RT) of the target network from $T_{LD}$ to produce:

$$T_{LWM} = T_{LD} - RT. \quad (3)$$

$T_{LWM}$ is the time at which the MN 102 must initiate handoff. The signal strength at this time is the LWM, and can be calculated using the $RCSS_i$ as follows:

$$LWM = S_i - (T_{LWM} - T_i)^* RCSS_i, \quad (4)$$

where $T_i$ is the time instant for which $RCSS_i$ is calculated. ($RCSS_i$ is the difference between RCSS values that are n samples apart divided by n* delta, where delta is the sample duration.) All parameters have the same unit of time (e.g., milliseconds). Also, since the rate of signal strength change is not constant, the MN 102 calculates new LWM values for each signal sample it receives. Alternatively, the MN 102 can be configured to calculate the LWM less frequently, e.g., every second or so, instead of every 100 ms.

After calculating the LWM at step 318, the method determines whether the signal strength on the current interface is greater than the LWM (step 320). As long as the signal strength is greater, the MN 102 remains on the current interface. When the signal strength is no longer greater than the LWM (is equal to or drops below the LWM), the method initiates handoff to the target interface (step 322). (Now the target interface becomes the current interface). The method continues to monitor the HWMs on the available interfaces. When the signal strength on the preferred (highest ranked) interface increases above the HWM for the preferred interface, the method initiates handoff to the preferred interface (steps 324, 326). Alternatively, when the signal strength on the preferred interface has not increased above its HWM, but the signal strength on an interface ranked higher than the current interface is greater than the HWM for the interface, the method initiates handoff to the higher ranked interface (steps 328, 330). When the signal strength on the preferred interface has not increased above its HWM, and the signal strength on an interface ranked higher than the current interface is not greater than the HWM for the interface ("no" path at step 328), the method proceeds to step 304 to continue monitoring the signal strength on the current interface and make handoff decisions in accordance with the method as previously described. The method proceeds to step 304 from steps 326 and 330 as well.

Figure 4:
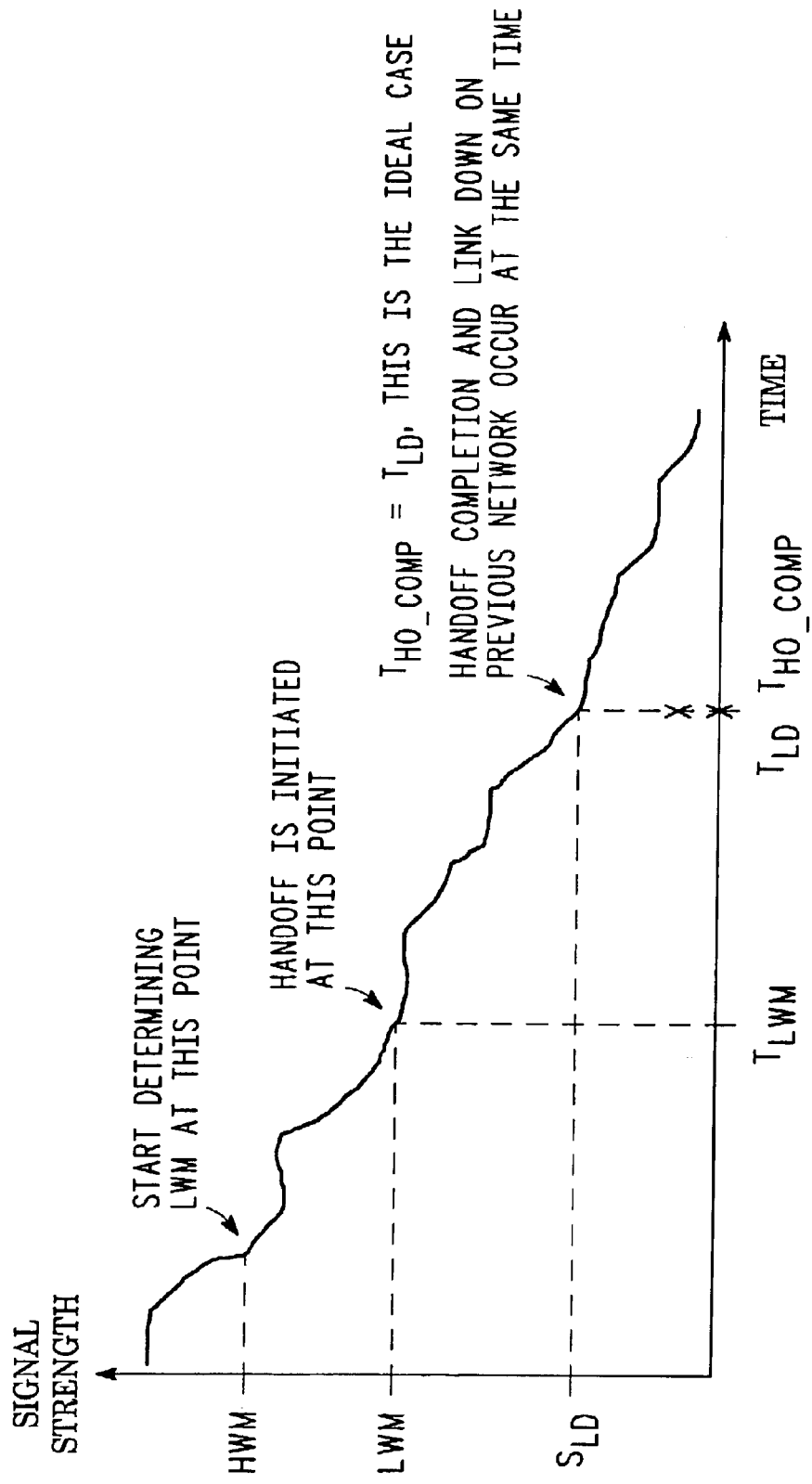
FIG. 4 is a graphical illustration of the method of FIG. 2 wherein the value of the LWM is optimal.
Figure 5:
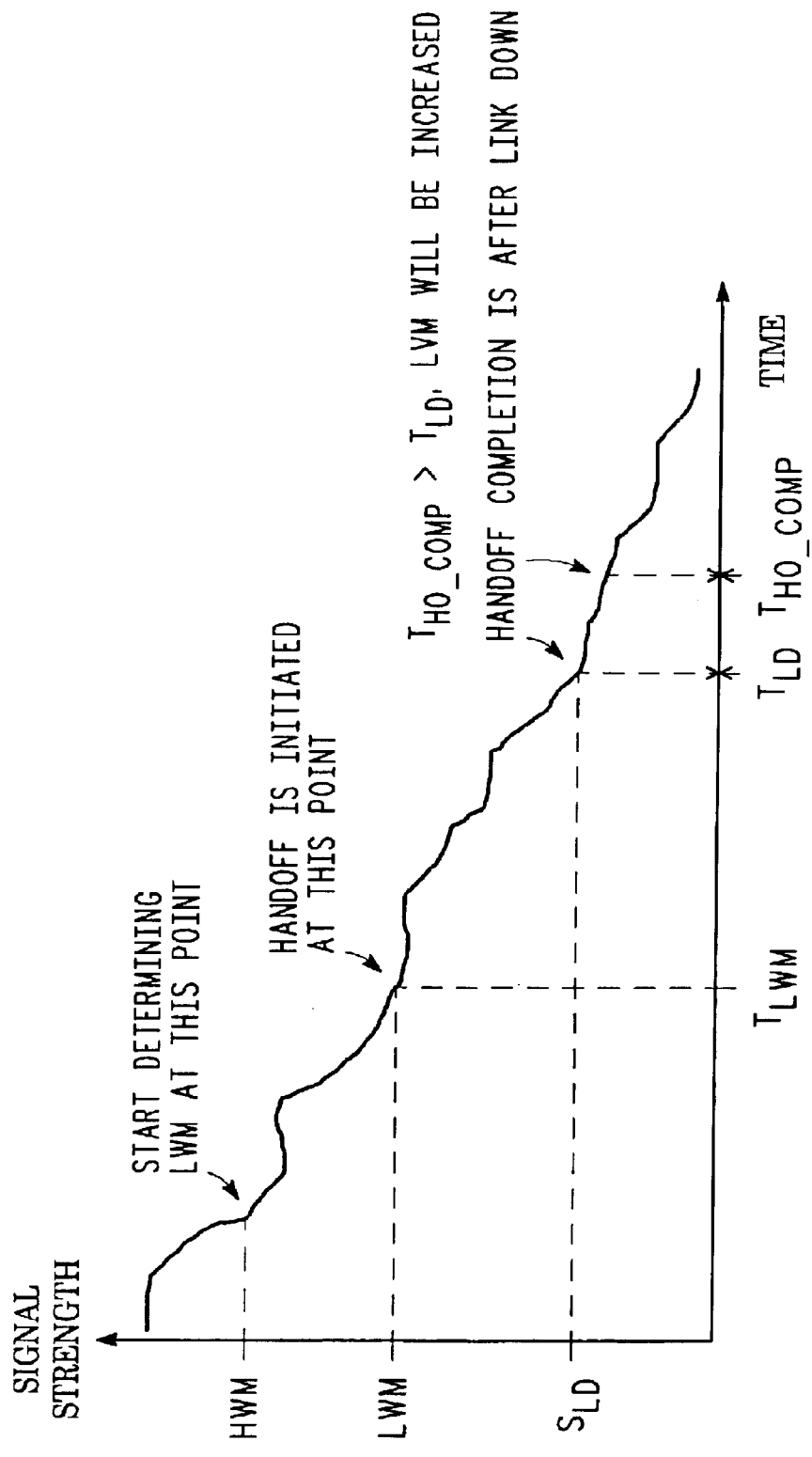
FIG. 5 is a graphical illustration of the method of FIG. 2 wherein the value of the LWM is too low.
Figure 6:
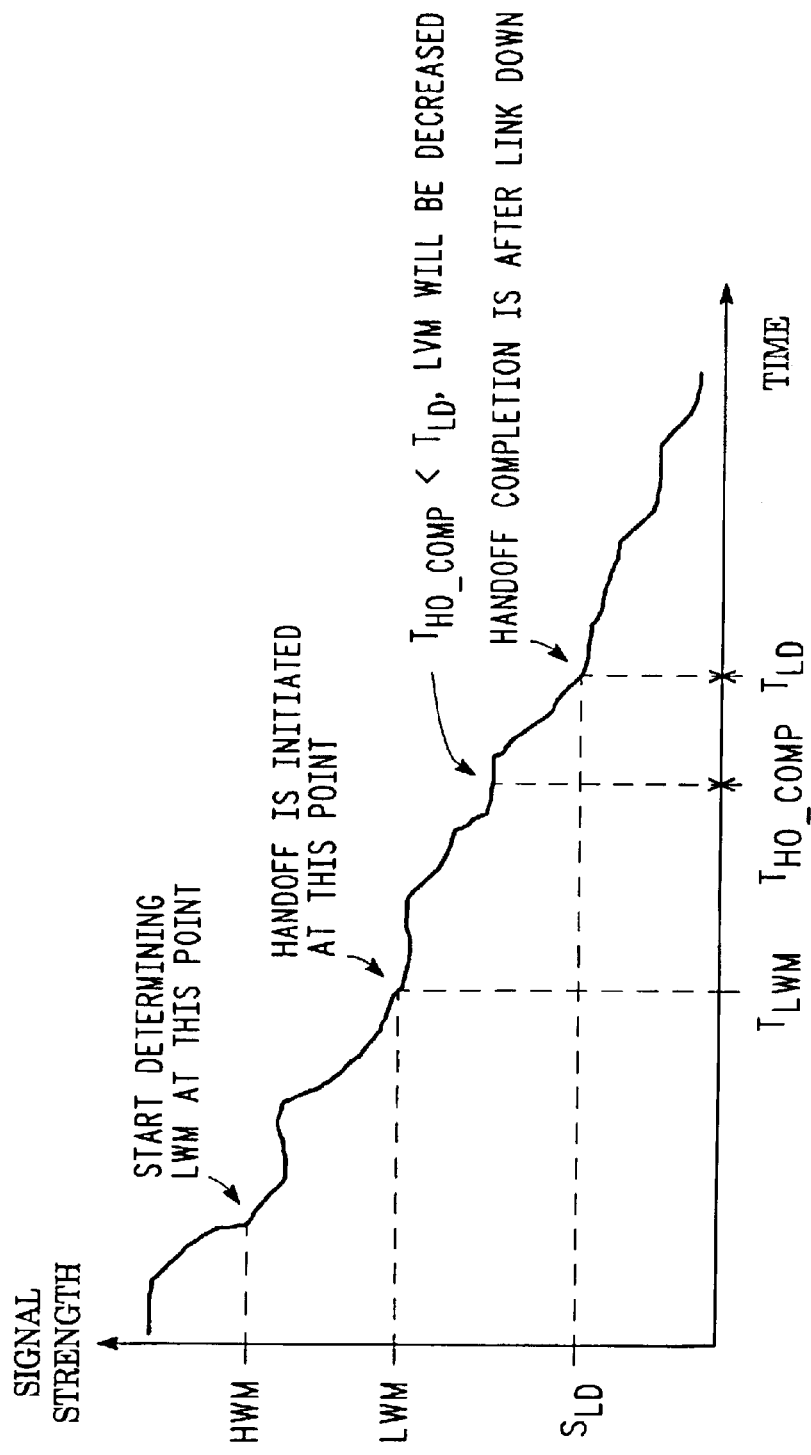
FIG. 6 is a graphical illustration of the method of FIG. 2 wherein the value of the LWM is too high.

FIGS. 4–6 are graphical illustrations of the adaptive handoff triggering events. As previously described, when the signal strength on a current interface falls below the HWM, the MN 102 starts scanning the other interfaces to determine which interface it can handoff to. The criteria for choosing the new interface depends on the preference list, the signal strength on the interfaces and the availability of the interfaces. Once the target interface is identified, the adaptive LWM value is calculated. When the signal strength on the current interface reaches the LWM, a handoff to the target network is initiated. FIG. 4 illustrates the case where the time the handoff is completed, $T_{ho\_comp}$, is the same as the time when the layer 2 link went down on the previous network, $T_{LD}$. This represents the ideal case where the LWM is optimal. The MN 102 is on the preferred network for as long as possible without experiencing a layer 3 blackout.

FIG. 5 illustrates the case where the signal fall rate is faster after the mobile node initiates a handoff. In such a case, link down may arrive sooner than the MN 102 had anticipated. There will be a blackout period before the Registration Reply is received on the new interface. The MN 102 may optionally adjust the LWM calculation for the next similar handoff based on this blackout time by increasing the LWM value.

FIG. 6 illustrates the case where the signal fall rate is slower after the MN 102 initiates a handoff. In this case, the handoff may be completed before the link down. There is no blackout in this case, but the MN 102 could have been on the preferred network for a longer period of time. The mobile node may optionally adjust the LWM calculation for the next similar handoff based on the excess time by decreasing the LWM value.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the invention as defined by the following appended claims.

What is claimed is:

1. In a mobile communication device configured to support a plurality of interfaces, a method of handoff comprising:

sensing that a signal strength on a current interface of the plurality of interfaces is at or below a first threshold for the current interface;

determining whether a signal strength of an available interface of the plurality of interfaces is greater than a first threshold for the available interface;

when the signal strength of the available interface is greater than the first threshold, determining whether a foreign agent advertisement has recently been received on the available interface;

when a foreign agent advertisement has recently been received, identifying the available interface as a target interface;

calculating a second threshold; and initiating a first handoff to the target interface when the signal strength on the current interface reaches the second threshold.

2. The method of claim 1 wherein the step of calculating a second threshold comprises:

determining a signal strength $S_i$ of the current interface, wherein $S_i$ is determined at time $T_i$;

determining a rate of change of signal strength $RCSS_i$, wherein $RCSS_i$ is determined at time $T_i$;

determining a time at which a signal strength on the current interface will reach a level where layer 2 connectivity is lost;

determining a registration time of the target interface;

deducting the registration time from the time at which a signal strength on the current interface will reach a level where layer 2 connectivity is lost to produce $T_{LWM}$; and determining that the second threshold is equal to $S_i - [(T_{LWM} - T_i) \times RCSS_i]$.

3. The method of claim 2 wherein determining a registration time of the target interface comprises:

transmitting a ping to a home agent;

determining a round trip time of the ping; and adding the round trip time to a fixed time duration for performing a registration update at the home agent.

4. The method of claim 2 wherein determining a registration time of the target interface comprises:

transmitting a dummy registration request;

receiving a reply;

measuring a time difference between transmitting the dummy request and receiving the reply; and using the time difference to determine the registration time.

5. The method of claim 2 wherein determining a registration time of the target interface comprises receiving the registration time from a foreign agent for the target interface.

6. The method of claim 2 wherein determining a rate of change of signal strength $RCSS_i$ comprises solving $RCSS_{i+n+1} = (S_{i+1} - S_{i+n+1})/(n*\Delta)$.

7. The method of claim 1 further comprising initiating a second handoff to a higher ranked interface when a signal strength on the higher ranked interface increases above the first threshold for the higher ranked interface.

8. The method of claim 1 further comprising initiating a second handoff to a preferred interface when a signal strength on the preferred interface increases above the first threshold for the preferred interface.

9. A mobile communication device configured to support a plurality of interfaces, each interface associated with an access network, the device comprising:

a receiver for receiving signals from an access network;

a processor coupled to the receiver, the processor sensing that a signal strength on the current interface is at or below a first threshold for the current interface; determining whether a signal strength of an available interface of the plurality of interfaces is greater than a first threshold for the available interface; when the signal strength of the available interface is greater than the first threshold, determining whether a foreign agent advertisement has recently been received on the available interface; when a foreign agent advertisement has recently been received, identifying the available interface as a target interface; and determining that the device should initiate handoff to the target interface when the signal strength on the current interface reaches the second threshold; and a transmitter coupled to the processor for transmitting signals to an access network.

* * * * *